(12) United States Patent
Hatakeyama et al.

(10) Patent No.: US 9,697,734 B2
(45) Date of Patent: Jul. 4, 2017

(54) INFORMATION DISPLAY DEVICE FOR VEHICLE AND INFORMATION DISPLAY METHOD FOR VEHICLE

(71) Applicant: TOYOTA JIDOSHA KABUSHIKI KAISHA, Toyota-shi, Aichi (JP)

(72) Inventors: Yoshiyuki Hatakeyama, Fuji (JP); Shoichi Hayasaka, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/101,435

(22) PCT Filed: Feb. 10, 2014

(86) PCT No.: PCT/JP2014/053072
§ 371 (c)(1),
(2) Date: Jun. 3, 2016

(87) PCT Pub. No.: WO2015/098136
PCT Pub. Date: Jul. 2, 2015

(65) Prior Publication Data
US 2016/0379497 A1    Dec. 29, 2016

(30) Foreign Application Priority Data

Dec. 27, 2013    (JP) ................. 2013-272497

(51) Int. Cl.
*B60Q 1/00*     (2006.01)
*G08G 1/16*     (2006.01)
*B60R 1/00*     (2006.01)

(52) U.S. Cl.
CPC ............... *G08G 1/166* (2013.01); *B60R 1/00* (2013.01); *G08G 1/16* (2013.01); *B60R 2300/205* (2013.01); *B60R 2300/8093* (2013.01)

(58) Field of Classification Search
CPC .... G08G 1/166; G08G 1/16; B60R 2300/205; B60R 2300/8093
(Continued)

(56) References Cited

U.S. PATENT DOCUMENTS

2011/0199197 A1    8/2011  Takatsudo et al.
2012/0182426 A1*   7/2012  Fukuda ................. G06T 7/0042
                                                         348/148
2014/0222326 A1    8/2014  Sato et al.

FOREIGN PATENT DOCUMENTS

CN     102549631 A     7/2012
JP     H04-349599 A    12/1992
(Continued)

*Primary Examiner* — Daryl Pope
(74) *Attorney, Agent, or Firm* — Oliff PLC

(57) ABSTRACT

An information display device for a vehicle includes a object detection sensor that detects a target object positioned around a host vehicle, and a display unit that displays a first object marker which is displayed so as to surround the target object detected by the object detection sensor on a display area positioned between a driver of the host vehicle and the target object, and in a case where a distance from the host vehicle to the target object is long, that displays a second object marker with a degree of emphasis of the vertical components suppressed compared to a degree of emphasis of the vertical components of the first object marker in a case where the distance from the host vehicle to the target object is short.

5 Claims, 14 Drawing Sheets

(58) Field of Classification Search
USPC ......... 340/425.5, 426.1, 901, 902, 903, 904, 340/905, 937, 435, 436; 348/148
See application file for complete search history.

(56) References Cited

FOREIGN PATENT DOCUMENTS

| | | |
|---|---|---|
| JP | 2008-094377 A | 4/2008 |
| JP | 2010-039793 A | 2/2010 |
| JP | 2010-108264 A | 5/2010 |
| JP | 2011-108110 A | 6/2011 |
| JP | 2011-119917 A | 6/2011 |
| JP | 2013-032087 A | 2/2013 |
| WO | 2013/030903 A1 | 3/2013 |

* cited by examiner

Fig.5
(a) H<Th
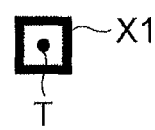
(b) H≧Th
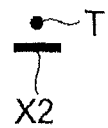

Fig.6
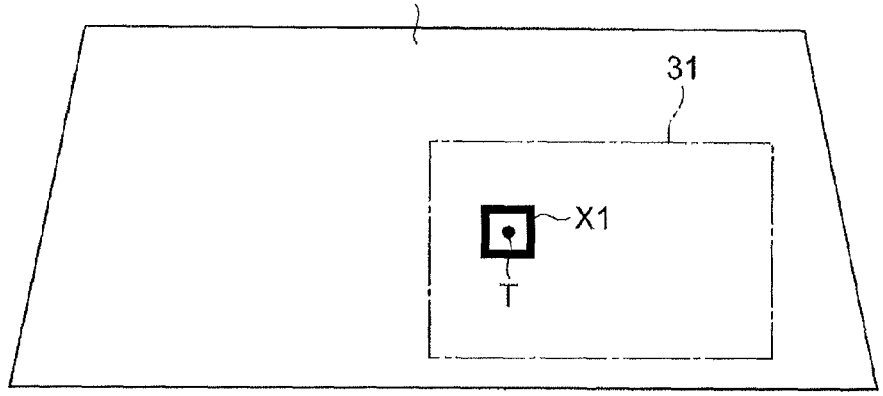
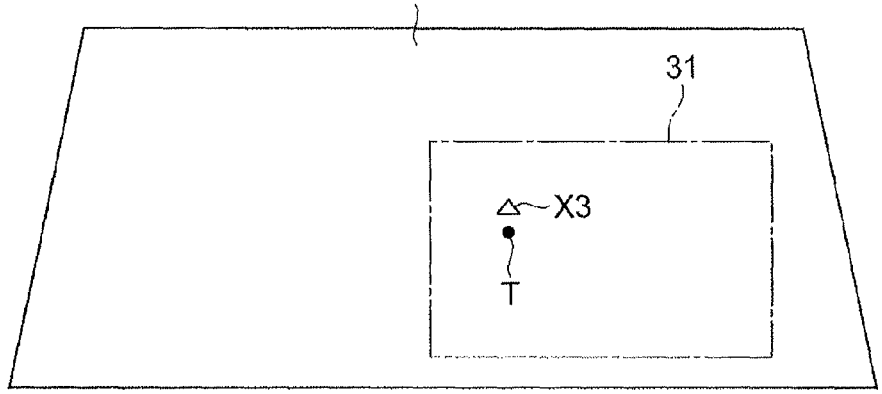

Fig.7
(a) H<Th
(b) H≧Th

Fig.8
(a) H<Th
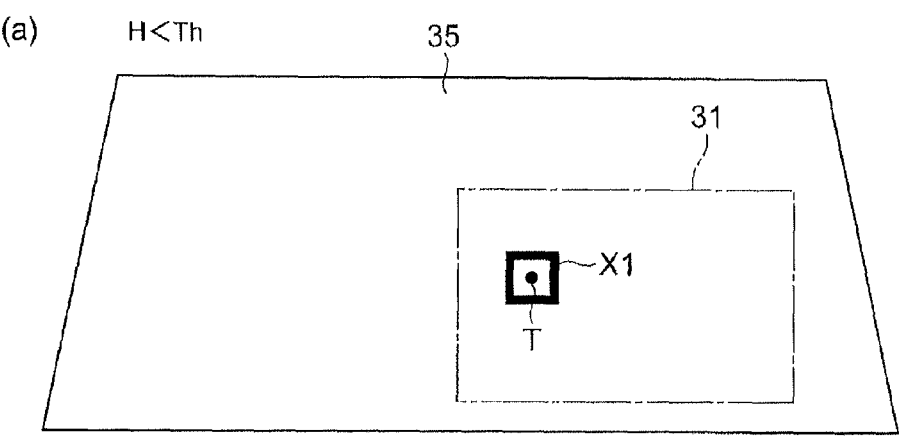
(b) H≧Th
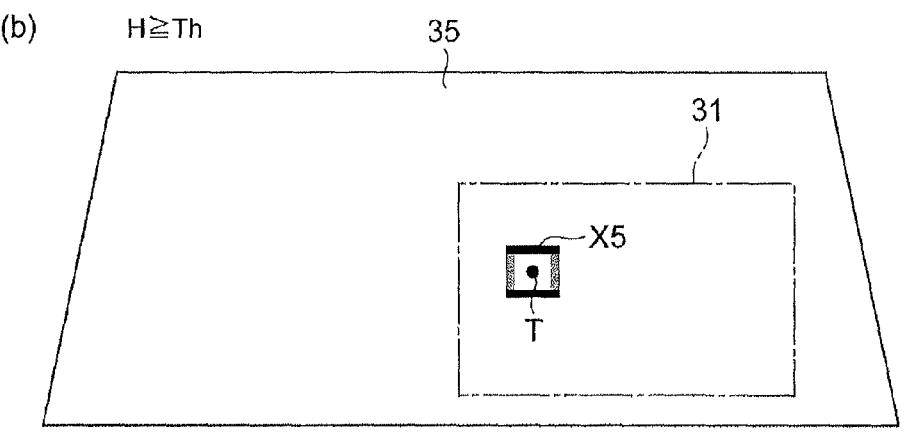

*Fig.9*
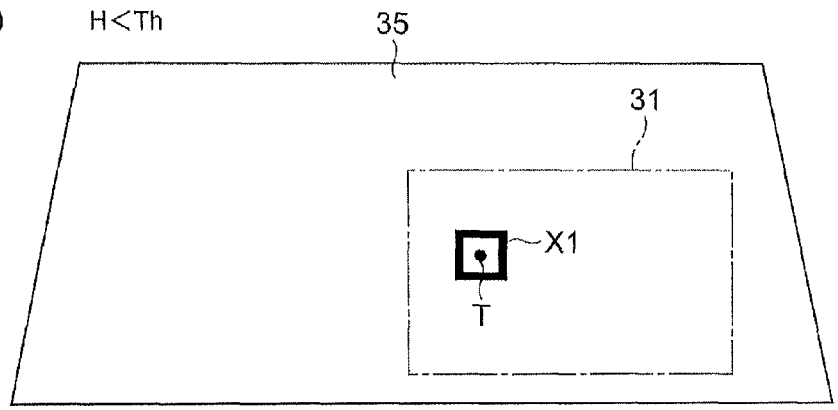
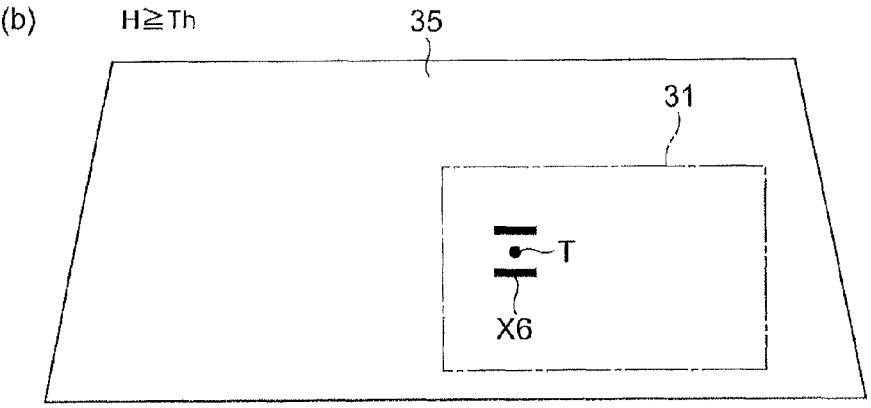

*Fig.10*
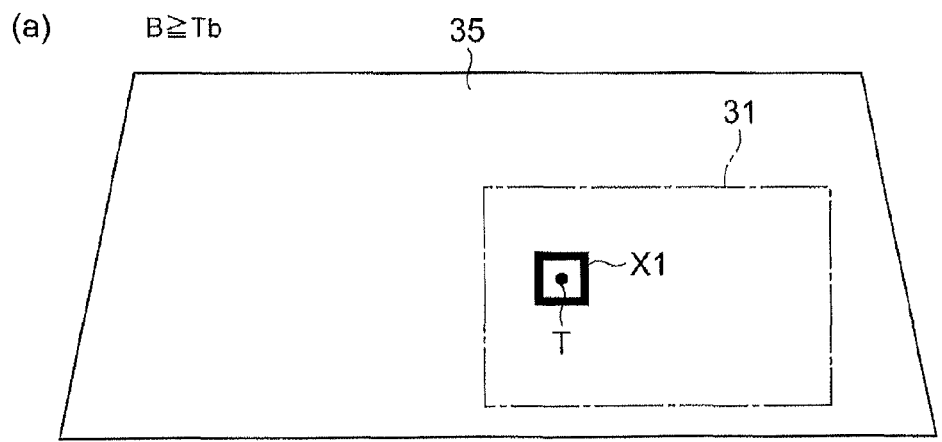
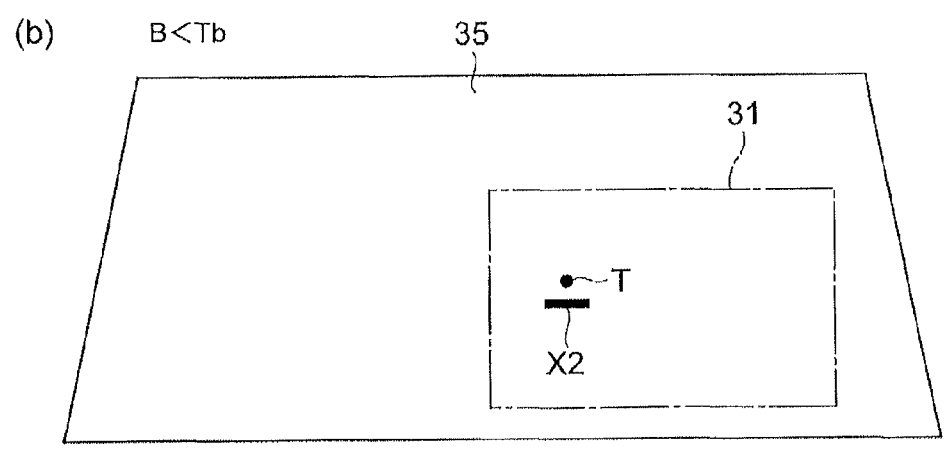

*Fig.11*
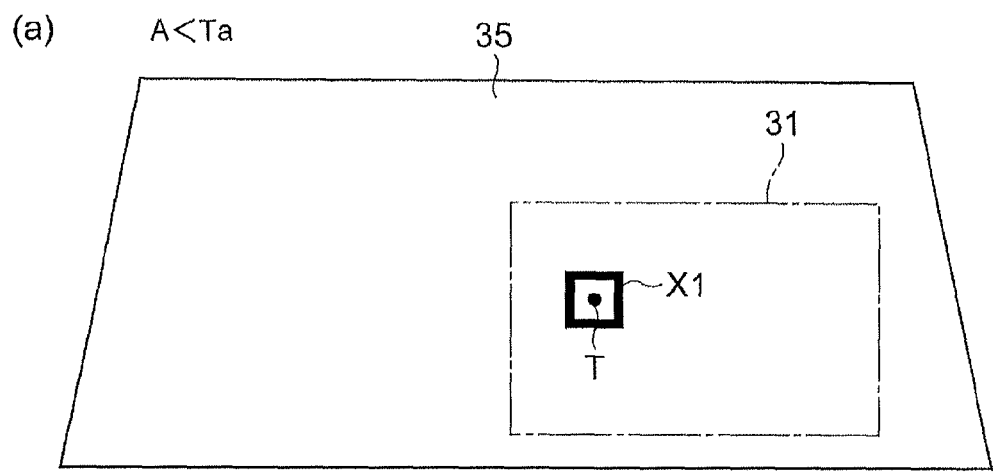
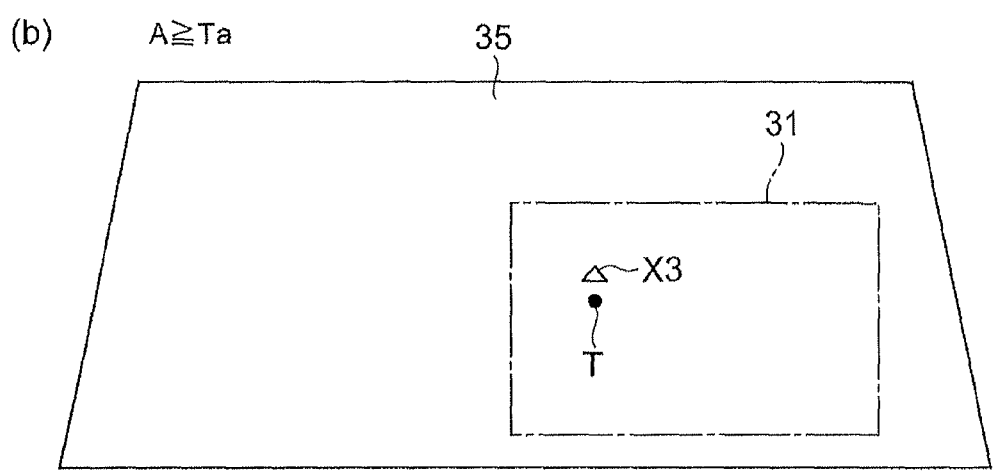

Fig.12
| | $B \geq Tb$ | $B < Tb$ |
|---|---|---|
| $H < Th$ |  X1 |  X3 |
| $H \geq Th$ | 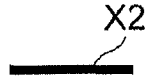 X2 | 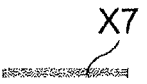 X7 |

INFORMATION DISPLAY DEVICE FOR VEHICLE AND INFORMATION DISPLAY METHOD FOR VEHICLE

TECHNICAL FIELD

An aspect of the present invention relates to an information display device for a vehicle that displays information of a target object positioned around a vehicle, and an information display method for a vehicle that displays information of a target object positioned around a vehicle.

BACKGROUND ART

An information display device for a vehicle is a device that detects a target object which is present around a vehicle and displays information of the target object. Japanese Unexamined Patent Publication No. 2011-119917 discloses a display device for a vehicle which specifies an image including a pedestrian from images captured by a camera and detects the pedestrian, and emphatically displays the pedestrian on a display device using an object marker such as a pedestrian detection frame which surrounds the pedestrian. As the display device described above, a head-up display which projects the image on a windshield has been disclosed. In the display device for a vehicle described above, it is possible to reliably convey the presence of the target object to a driver of the vehicle and to cause the driver to pay attention by emphatically displaying the target object such as the pedestrian using the object marker.

CITATION LIST

Patent Literature

[Patent Literature 1] Japanese Unexamined Patent Publication No. 2011-119917

SUMMARY OF INVENTION

Technical Problem

As described above, in the method in which the target object is emphatically displayed by displaying the object marker on a display area such as on the windshield, due to a difference between a distance from the eyes of the driver to the display area and a distance from the eyes of the driver to the target object, when the driver gazes at the target object, the object marker on the display area is seen in duplicate or looks blurred. As described above, since the object marker is seen in duplicate or looks blurred, there is a possibility to give a confusion to the driver when the driver gazes at the target object with two eyes.

Therefore in the present technical field, it is desirable to provide an information display device for a vehicle and an information display method for a vehicle that can reduce the confusion that the driver may feel.

Solution to Problem

An information display device for a vehicle according to an aspect of the present invention includes: a target object detection unit configured to detect a target object positioned around a host vehicle; and a display unit configured to display an object marker which is displayed so as to surround the target object in order to emphatically display the target object detected by the target object detection unit on a display area positioned between a driver of the host vehicle and the target object, and configured to display the object marker with a degree of emphasis of the vertical components of the object marker suppressed in a case where a distance from the host vehicle to the target object is long compared to a degree of emphasis of the vertical components of the object marker in a case where the distance from the host vehicle to the target object is short.

In a case where the distance from the host vehicle to the target object is long, the difference between the distance from the eyes of the driver to the target object and the distance from the eyes of the driver to the display area becomes longer compared to a case where the distance from the host vehicle to the target object is short. Accordingly, the object marker is easily blurred when the driver gazes at the target object, since a focus point of the eyes of the driver tends to shift largely. Furthermore, a position of the focus point easily shifts in the horizontal direction due to the fact that the two eyeballs of the driver are arranged in the horizontal direction, and thus, the object marker is easily blurred in the horizontal direction. Therefore, in the information display device for a vehicle according to the aspect of the present invention, the degree of emphasis of the vertical components of the object marker displayed so as to surround the target object is suppressed when the distance from the host vehicle to the target object becomes long. As described above, since the degree of emphasis of the vertical components of the object marker which easily blurs is suppressed, the driver feels the object marker less blurring, and thus, the driver feels less confusion in emphatically displaying the target object using the object marker. Therefore, it is possible to reduce the confusion that the driver may feel.

The display unit may display the object marker with the degree of emphasis suppressed in a case where the distance from the host vehicle to the target object is equal to or longer than a predetermined first threshold value compared to the degree of emphasis in a case where the distance from the host vehicle to the target object is shorter than the predetermined first threshold value. As described above, in a case where the distance from the host vehicle to the target object is equal to or longer than the first threshold value, the degree of emphasis of the vertical components of the object marker is suppressed compared to a case where the distance from the host vehicle to the target object is shorter than the first threshold value. Accordingly, since the degree of emphasis of the vertical components of the object marker which easily blurs is suppressed, the driver feels the object marker less blurring, and thus, the driver feels less confusion in emphatically displaying the target object using the object marker. Therefore, it is possible to reduce the confusion that the driver may feel.

In addition, the information display device for a vehicle may further include a driver side distance detection unit configured to detect a distance from the display area to the driver. The display unit may display the object marker with the degree of emphasis of the vertical components of the object marker suppressed in a case where the distance from the display area to the driver is short compared to the degree of emphasis of the vertical components of the object marker in case where the distance from the display area to the driver is long. For example, in a case where the distance from the host vehicle to the target object is fixed, the focus point of the eyes of the driver with respect to the object marker on the display area shifts easily when the distance from the display area to the driver becomes short. Therefore, in a case where the distance from the display area to the driver is short, it is possible to reduce the possibility of the driver recognizing that the object marker is blurred by suppressing the degree of emphasis of the vertical components of the object marker. Accordingly, it is possible to reduce the confusion that the driver may feel.

In addition, the display unit may display the object marker with the degree of emphasis suppressed in a case where the distance from the display area to the driver is shorter than a predetermined second threshold value compared to the degree of emphasis in a case where the distance from the display area to the driver is equal to or longer than the second threshold value. As described above, in a case where the distance from the display area to the driver is shorter than the second threshold value, the degree of emphasis of the vertical components of the object marker is suppressed compared to a case where the distance from the display area to the driver is equal to or longer than the second threshold value. Therefore, since the degree of emphasis of the vertical components of the object marker which easily blurs is suppressed, it is possible to reduce the possibility of the driver recognizing that the object marker is blurred. Therefore, it is possible to reduce the confusion that the driver may feel.

In addition, the display area may be a head-up display of the host vehicle. As described above, in a case where the display area is a head-up display, the information of the target object (the object marker) is displayed on a substantially line-of-sight of the driver of the host vehicle. Accordingly, the driver of the host vehicle can be aware of the position of the target object almost without moving the line-of-sight. Therefore, the timing of the driver noticing the target object can be earlier.

An information display method for a vehicle according to another aspect of the present invention includes: a step of detecting the target object for detecting a target object positioned around a host vehicle; and a step of displaying an object marker which is displayed so as to surround the target object in order to emphatically display the target object detected in the step of detecting the target object on a display area positioned between a driver of the host vehicle and the target object, and displaying the object marker with a degree of emphasis of the vertical components of the object marker suppressed in a case where a distance from the host vehicle to the target object is long compared to a degree of emphasis of the vertical components of the object marker in a case where the distance from the host vehicle to the target object is short.

In the information display method for a vehicle according to another aspect of the present invention, in the step of displaying, the degree of emphasis of the vertical components is suppressed in a case where the distance from the host vehicle to the target object is long. As described above, since the object marker is displayed with the degree of emphasis of the vertical components of the object marker which easily blurs suppressed, the driver feels the object marker less blurring. Therefore, it is possible to reduce the confusion that the driver may feel.

In addition, in the step of displaying, the object marker may be displayed with the degree of emphasis suppressed in a case where the distance from the host vehicle to the target object is equal to or longer than a predetermined first threshold value compared to the degree of emphasis in a case where the distance from the host vehicle to the target object is shorter than the predetermined first threshold value. As described above, in a case where the distance from the host vehicle to the target object is equal to or longer than the first threshold value, the degree of emphasis of the vertical components of the object marker is suppressed compared to the case where the distance from the host vehicle to the target object is shorter than the first threshold value. Accordingly, since the degree of emphasis of the vertical components of the object marker which easily blurs is suppressed, the driver feels the object marker less blurring, and thus, the driver feels less confusion in emphatically displaying the target object using the object marker. Therefore, it is possible to reduce the confusion that the driver may feel.

Advantageous Effects of Invention

According to various aspects and embodiments of the present invention, it is possible to reduce the confusion that the driver may feel.

BRIEF DESCRIPTION OF DRAWINGS

FIG. 5 is a schematic diagram for describing a display mode of an object marker.

FIG. 6 is a schematic diagram for describing a modification example of a display mode of the object marker.

FIG. 7 is a schematic diagram for describing another modification example of a displaying mode of the object marker.

FIG. 8 is a schematic diagram for describing still another modification example of a displaying mode of the object marker.

FIG. 9 is a schematic diagram for describing still another modification example of a displaying mode of the object marker.

FIG. 10 is a schematic diagram for describing a displaying mode of an object marker according to a distance from the eyes of the driver to a display area.

FIG. 11 is a schematic diagram for describing a displaying mode of an object marker according to a distance from the eyes of the driver to a display area.

FIG. 12 is a diagram for describing various displaying modes of an object marker.

DESCRIPTION OF EMBODIMENTS

Hereinafter, a preferable embodiment of the present invention will be described with reference to the drawings. In the description described above, the same reference signs will be given to the same or corresponding elements and the description thereof will not be repeated.

Figure 1:
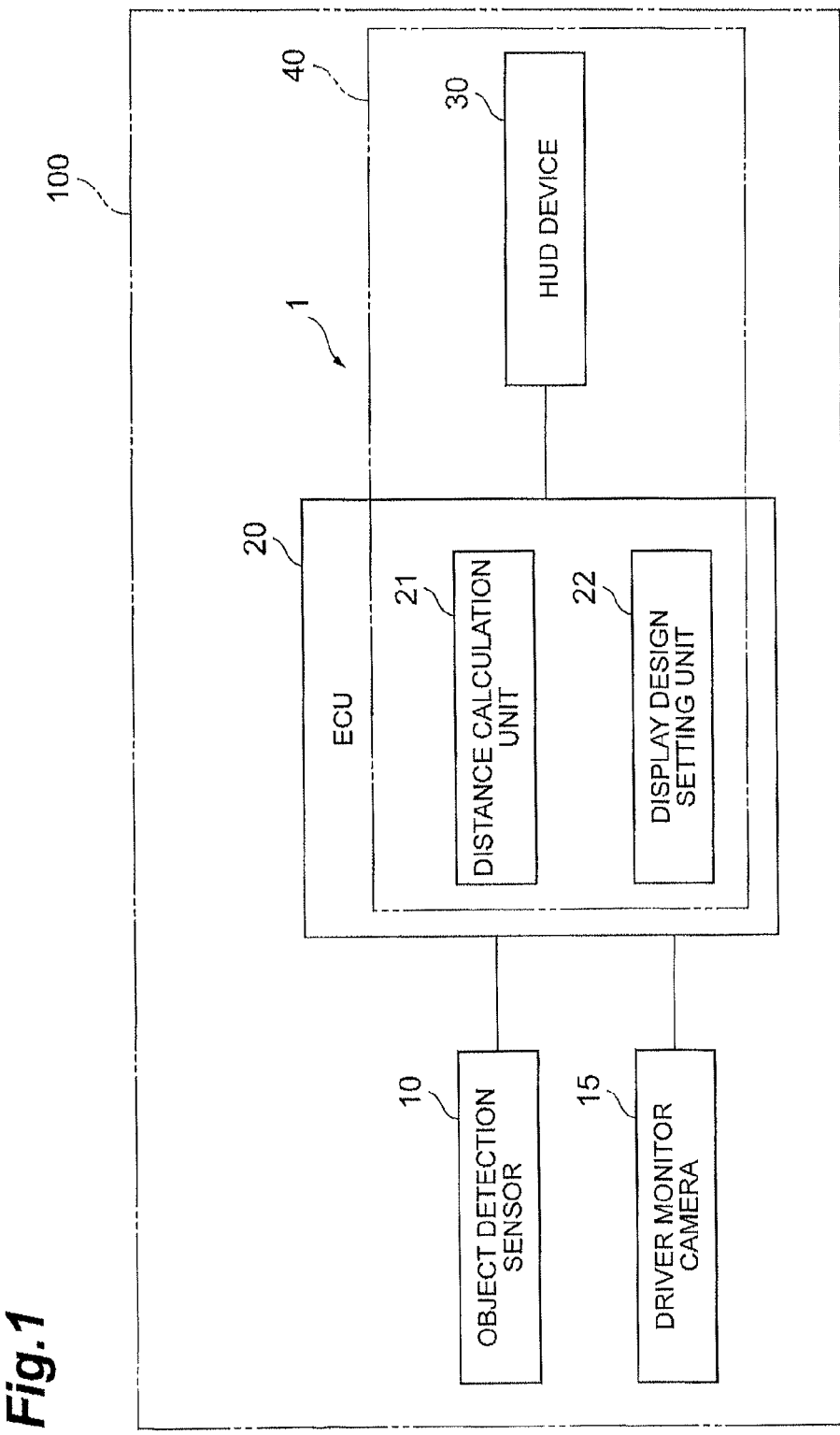
FIG. 1 is a block diagram illustrating an information display device for a vehicle in the present embodiment.

As illustrated in FIG. 1, an information display device 1 for a vehicle in the present embodiment is mounted on a vehicle 100. The information display device 1 for a vehicle detects a target object T (refer to FIG. 5) around the vehicle 100 and causes a first object marker X1 or a second object marker X2 which correspond to the target object T to be displayed on a display area 31 of a head-up display (HUD)

device 30 which is a display system human machine interface (HMI). As the target object T around the vehicle 100, for example, dangerous target objects such a pedestrian, a bicycle, a motorcycle, or another vehicle other than the vehicle 100 that may possibly interfere with the travelling of the vehicle 100 can be included. Various methods can be adopted as a method for determining whether or not the pedestrian or the like around the vehicle 100 is the target object T.

The information display device 1 for a vehicle includes an object detection sensor (target object detection unit) 10 that detects the target object T positioned around the vehicle 100 which is a host vehicle and the HUD device 30 that displays the first object marker X1 or the second object marker X2 associated with the target object T in order to emphatically display the target object T on the display area 31. Here, the object marker is a graphic, a symbol, or an icon displayed on the display area 31, and is a marker displayed in association with the target object T as, for example, the frame-shaped first object marker X1 that surrounds the target object T illustrated in FIG. 5. As described above, the target object T can be emphatically displayed on the display area 31 by causing the object marker to be displayed in association with the target object T on the display area 31.

The display area 31 in the present embodiment is a head-up display set at the driver's seat side of a windshield 35 in a case of viewing forward from inside of the vehicle 100, and is visible to a driver M of the vehicle 100 (refer to FIG. 2) during driving. Here, the head-up display is a display that overlaps information to the field of view of the driver M of the vehicle 100. For example, a transparent plate installed on the windshield 35 or on the front side of the windshield 35 can be used as the head-up display.

The driver M can visibly recognize the target object T through the display area 31, since the target object T is positioned on the outer side of the windshield 35 viewed from the driver M of the vehicle 100. Furthermore, the driver can visibly recognize the display area 31 easily, by arranging the display area 31 at the driver's seat side of the windshield 35. Thus, it is possible to realize a compact size of the display area 31 with the visibility of the driver improved.

The HUD device 30 causes the object marker to be displayed with a degree of emphasis of the vertical components of the object marker more suppressed as the distance from the vehicle 100 to the target object T becomes longer. Here, the degree of emphasis of the object marker indicates an easiness for the driver M to recognize the object marker such as a chromaticity of the object marker, a thickness of the object marker, a brightness of the object marker, whether or not a color of the object marker are easy to recognize, or whether or not the color of the object marker is a color (for example, red) set in advance for indicating the high degree of dangerousness. Suppressing the degree of emphasis means making it difficult for the driver M to visibly recognize the object marker, such as making the object marker pale colored, making the frame that configures the object marker narrow, reducing the brightness of the object marker, changing the color of the object marker to a color difficult to be visibly recognized, or changing the color of the object marker from a color indicating a high degree of dangerousness to a color indicating a low degree of dangerousness.

The vertical components of the object marker indicates a portion extending in a vertical direction (a perpendicular direction of the vehicle) of the object marker displayed on the display area 31. For example, in a case where the object marker is a rectangular frame, lines configuring a part of the rectangular frame and extending in the vertical direction are the vertical components of the object marker.

Suppressing the degree of emphasis of the vertical components of the object marker means making it difficult for the driver M to recognize the vertical components of the object marker. In a case where the object marker is a frame, an example of making the vertically extending line more inconspicuous than the horizontally extending line by making the vertically extending line pale colored or narrow, or by reducing the brightness is included. In a case where the object marker is the rectangular frame, an example of making the vertically extending straight line more inconspicuous than the horizontally extending straight line by making the vertically extending straight line pale colored or narrow, or by reducing the brightness is included. An example of making the vertical components of the displayed object marker inconspicuous by changing the frame-shaped object marker to another object marker (a horizontal line-shaped object marker or the like) of which the vertically extending area is smaller than that of the object marker is included.

An object detection sensor 10 is a sensor that detects an object around the vehicle 100 as the target object T, and particularly detects the presence or absence of an object that can be an obstacle. The object detection sensor 10 is provided at, for example, the front portion of the vehicle 100 (refer to FIG. 3). For example, the object detection sensor 10 outputs an electromagnetic wave around the vehicle 100 and receives the electromagnetic wave reflected from an object around the vehicle 100 and then, detects the target object T. As the object detection sensor 10, for example, millimeter wave radar, laser radar, a camera, or the like can be used. The information display device 1 for a vehicle may receive information from the outside such as another vehicle or an infrastructure on a road instead of using the object detection sensor 10, and then, may detect the target object T from the received information.

An electronic control unit (ECU) 20 that controls a image on the display area 31 by the HUD device 30, The ECU 20 is connected to the object detection sensor 10, and the HUD device 30 is connected to the ECU 20. The information on the target object T detected by the object detection sensor 10 is output to the ECU 20. The ECU 20 includes a distance calculation unit 21 that calculates various distances relating to the vehicle 100 and the target object T and a display design setting unit 22 that sets a display design of the first object marker X1 or the second object marker X2 displayed on the display area 31. The ECU 20 is an electronic control unit that includes, for example, a CPU, a memory such as ROM and RAM. The ECU 20 realizes functions of the distance calculation unit 21 and the display design setting unit 22 by the CPU executing a program, for example. The functions of the distance calculation unit 21 and the display design setting unit 22 may be realized by a plurality of ECUs.

Figure 2:
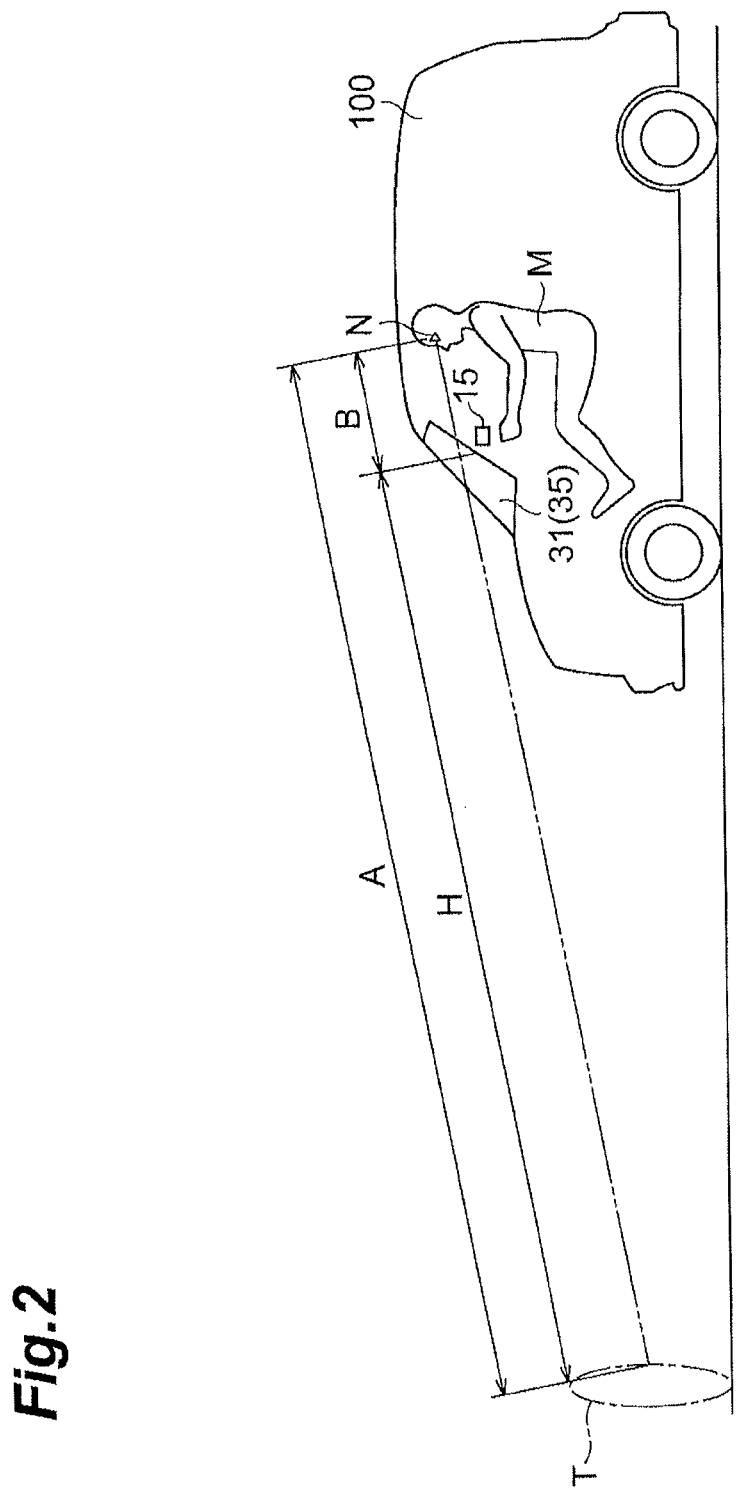
FIG. 2 is a schematic diagram for describing calculations of each distance.

As illustrated in FIG. 2, the distance calculation unit 21 calculates various distances relating to the vehicle 100 and the target object T from the information on the target object T detected by the object detection sensor 10. The distance calculation unit 21 calculates a target object distance A which is a distance from the target object T to the driver M, a driver side distance B which is a distance from the display area 31 on the windshield 35 to the driver M, and a distance H which is a difference between the target object distance A and the driver side distance B. Specifically, a distance from target object T to the eyes N of the driver M can be the target object distance A and a distance from the display area 31 to the eyes N of the driver M can be the driver side distance B. The distance H can be calculated by subtracting the driver side distance B from the target object distance A. That is, the distance H corresponds to a distance from the target object T to the display area 31.

The driver side distance B is calculated using, for example, a driver monitor camera 15 which is connected to the ECU 20. The driver monitor camera 15 obtains position coordinates of the eyes N of the driver M by capturing an image of the eyes N of the driver M and performing line-of-sight of the driver M measurement processing, and outputs the obtained position coordinates of the eyes N to the ECU 20. The distance calculation unit 21 of the ECU 20 calculates the distance from eyes N of the driver M to the display area 31 as the driver side distance B using the position coordinates of the eyes N of the driver M obtained by the driver monitor camera 15. As described above, the driver monitor camera 15 and the distance calculation unit 21 function as a driver side distance detection unit. The method of calculating the driver side distance B is not limited to the example using the above-described driver monitor camera 15, but various methods can be adopted. In addition, the driver side distance B may be stored in the memory of the ECU 20 in advance as a designed value (a fixed value) of the vehicle 100.

Figure 3:
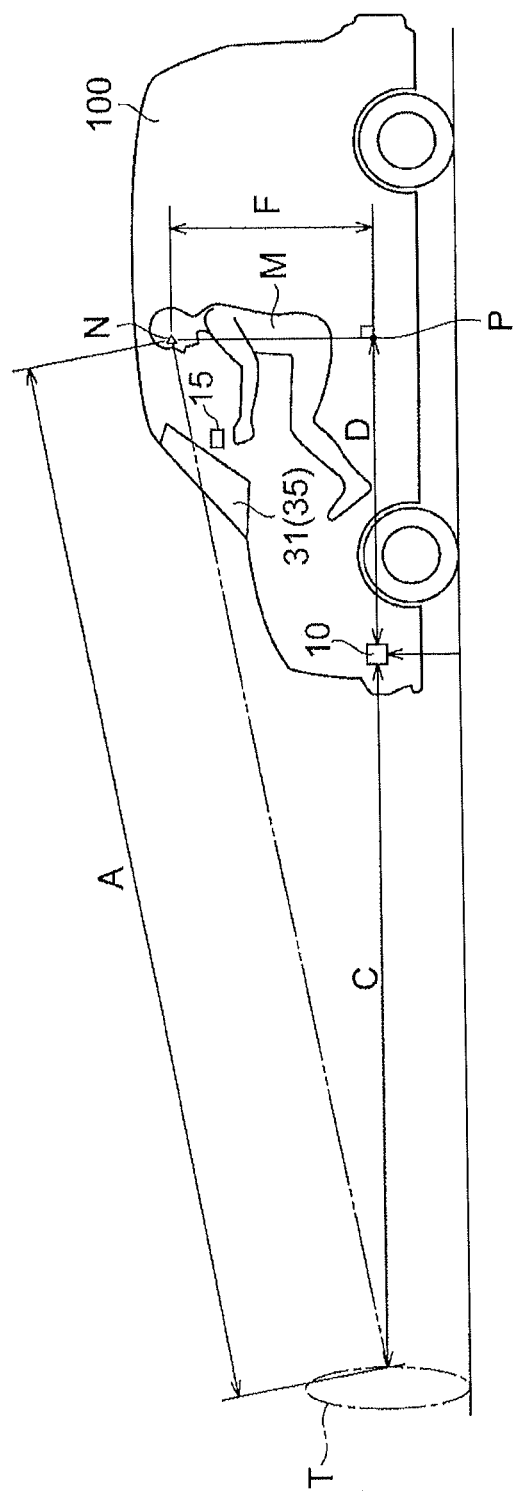
FIG. 3 is a schematic diagram for describing calculations of each distance.

The method of calculating the target object distance A by the distance calculation unit 21 will be described. For example, as illustrated in FIG. 3, first, the distance calculation unit 21 acquires a distance C in a horizontal direction between the target object T and the object detection sensor 10. Then, the distance calculation unit 21 acquires a distance D in a horizontal direction between a reference point P positioned immediately below the eyes N of the driver M and a object detection sensor 10 and a distance F in a vertical direction between the reference point P and the eyes N of the driver M using the position coordinates of the eyes N of the driver M obtained by the driver monitor camera 15, For example, with the position of the eyes N of the driver M as a predetermined position, the distance D and the distance F may be stored in the memory of the ECU 20 in advance as design values (fixed values) of the vehicle 100. As described above, after acquiring the distance C, the distance D, and the distance F, the distance calculation unit 21 can calculate the target object distance A using mathematical formula (1) described below.

[Mathematical (1)]

$$A = \frac{C+D}{\cos\left(\tan^{-1}\frac{F}{C+D}\right)} \quad (1)$$

The display design setting unit 22 selects the first object marker X1 or the second object marker X2 displayed on the display area 31. The first object marker X1 and the second object marker X2 are stored in the memory of the ECU 20, wherein the first object marker X1 is the frame-shaped object marker displayed on the display area 31 surrounding the target object T, and the second object marker X2 is displayed on the display area 31 with the degree of emphasis of the vertical components suppressed than that of the first object marker X1, and as a result, a difference between the degree of emphasis of the vertical components and the degree of emphasis of the horizontal component becomes high.

As illustrated in FIG. 5, for example, an under-bar that extends in the horizontal direction below the target object T can be used as the second object marker X2. In a case where the distance H calculated by the distance calculation unit 21 is shorter than a predetermined threshold value (first threshold value) Th, the display design setting unit 22 selects the first object marker X1, and in a case where the distance H is equal to or longer than the threshold value Th, the display design setting unit 22 selects the second object marker X2. Here, the threshold value Th is a value of the distance H which is selection criteria for selecting the first object marker X1 or the second object marker X2. This threshold value Th may be a fixed value set in advance or may be a variable value changed according to a predetermined regulation. For example, the threshold value Th is stored in the memory of the ECU 20 in advance, and may be, for example, 40 m. However, the value of the threshold value Th can voluntarily be changed.

The HUD device 30 causes the first object marker X1 or the second object marker X2 selected by the display design setting unit 22 of the ECU 20 to be displayed on the display area 31. In a case where the distance H which is the difference between the target object distance A and the driver side distance B is shorter than the threshold value Th, the HUD device 30 causes the first object marker X1 to be displayed on the display area 31 in the mode of surrounding the target object T, and in a case where the distance H is equal to or longer than the threshold value Th, causes the second object marker X2 to be displayed on the display area 31 in the mode of displaying the under-bar below the target object T. As described above, the distance calculation unit 21, the display design setting unit 22, and the HUD device 30 respectively functions as a display unit 40 that displays the first object marker X1 or the second object marker X2 corresponding to the target object T on the display area 31, and the driver M can easily recognize the target object T by the display unit 40 emphatically displaying the target object T.

Figure 4:
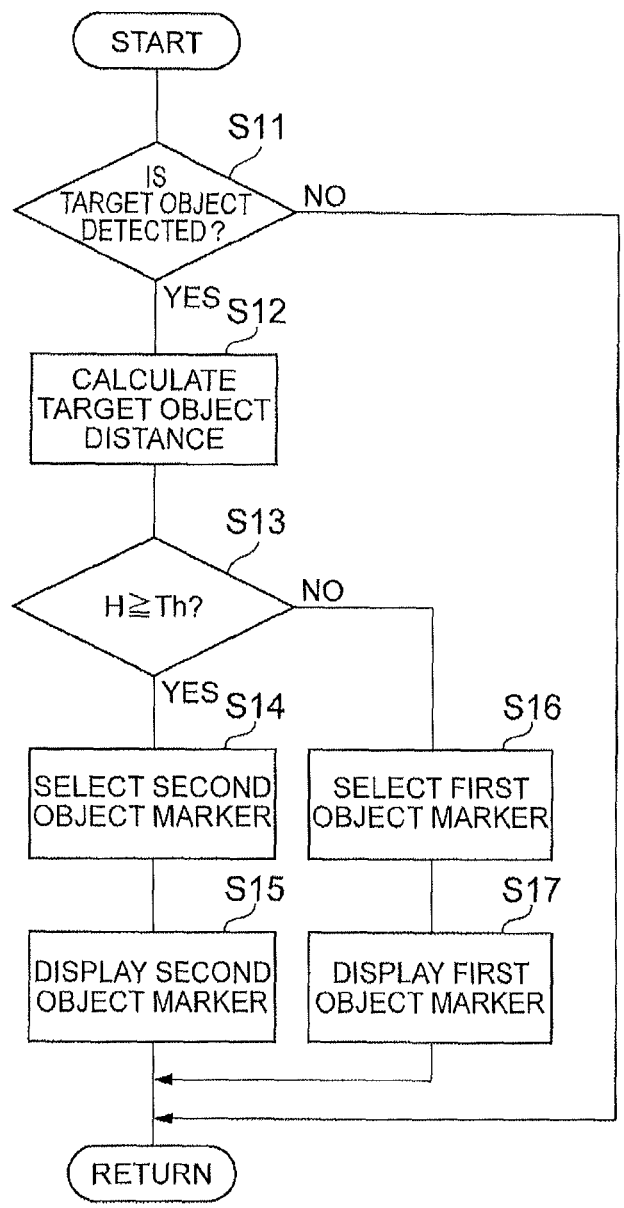
FIG. 4 is a flowchart illustrating information display processing for a vehicle in the present embodiment.

Next, an information display method for a vehicle in the present embodiment will be described with reference to FIG. 4. A flowchart illustrated in FIG. 4 illustrates a flow of information display processing for a vehicle performed using the display device 1 for a vehicle. The information display processing for a vehicle is repeatedly executed, for example, every constant time interval.

First, in STEP S11 (hereinafter, referred as "S11" and similar to other STEPs), the target object detection processing (step of detecting the target object) is executed by the object detection sensor 10. In S11, it is determined whether or not the target object T is present around the vehicle 100 by the object detection sensor 10. Specifically, for example, an environment around the vehicle 100 is measured by the object detection sensor 10 and it is determined whether or not the target object T which is a dangerous target object is present around the vehicle 100. In a case where it determined that the target object T is not present around the vehicle 100 in S11, a series of processing tasks ends, and in a case where it determined that the target object T is present around the vehicle 100 in S11, the process proceeds to S12.

In S12, distances calculation processing is executed by the distance calculation unit 21. In S12, the driver side distance B is acquired by the distance calculation unit 21 and the target object distance A is calculated from the distance C, the distance D, and the distance F. Then, the position of the target object T with respect to the vehicle 100 is estimated by the distance calculation unit 21. In addition, the distance H which is the difference between the target object distance A and the driver side distance B is calculated by the distance calculation unit 21.

Then, the process proceeds to S13 and difference comparison processing is executed. In S13, the comparison of the distance H calculated in S12 and the threshold value Th is performed. Then, in a case where the distance H is equal to or longer than the threshold value Th, the process proceeds to S14 and the second object marker X2 which is the under-bar is selected by the display design setting unit 22. When the second object marker X2 is selected in S14, the process proceeds to S15, and then, the second object marker is displayed by the HUD device 30 (step of displaying) and then, a series of processes ends. On the other hand, in a case where the distance H is not equal to or longer than the threshold value Th in S13, the process proceeds to S16 and the frame-shaped first object marker X1 is selected by the display design setting unit 22. When the first object marker X1 is selected in S16, the process proceeds to S17, and then, the first object marker X1 is displayed by the HUD device 30 (step of displaying) and then, a series of processes ends.

As described above, in the information display device 1 for a vehicle and the information display method for a vehicle in the present embodiment, in a case where the distance from the vehicle 100 to the target object T is long, the second object marker X2 is displayed, in which the degree of emphasis of the vertical components is suppressed compared to the degree of emphasis of the vertical components of the first object marker X1 which is displayed in a case where the distance from the vehicle 100 to the target object T is short. Here, the case where the distance from the vehicle 100 to the target object T is long indicates that the distance H is equal to or longer than the threshold value Th, and the case where the distance from the vehicle 100 to the target object T is short indicates that the distance H is not equal to or longer than the threshold value Th. As described above, the degree of emphasis of the vertical components which is easy to be blurred is suppressed by displaying the second object marker X2. Therefore, the driver feels less confusion in the emphatic display of the target object T. Therefore, the confusion that the driver may feel can be reduced. Furthermore, in the second object marker X2, since the degree of emphasis in the horizontal direction is not suppressed, the emphatic display of the target object T using the second object marker X2 can surely be performed. Accordingly, since the function of emphatic display of the target object T can always be achieved, it contributes to a safe driving of the driver M.

In addition, in a case where the distance H is long, which is the difference between the target object distance A that is the distance from the target object T to the driver M and the driver side distance B that is the distance from the display area 31 to the driver M, the object marker is easily blurred, when the driver M gazes at the target object T, since a focus point of the eyes N of the driver M with respect to the object marker on the display area 31 tends to shift largely in the horizontal direction. However, in the present embodiment, in a case where the distance H is long, the degree of emphasis of the vertical components is suppressed by displaying the second object marker X2. Accordingly, it is possible to suppress the possibility that the driver M may recognize that the object marker is blurred. Therefore, the confusion that the driver M may feel can be reduced.

In addition, since the display area 31 is a head-up display of the vehicle 100, the information of the target object T is displayed on a substantially line-of-sight of the driver M. Accordingly, the driver M can check the target object T almost without moving the line-of-sight. Therefore, the timing of the driver M noticing the target object T can be earlier. Furthermore, it is possible for the driver M to quickly implement a behavior (for example, deceleration or steering) to cope with the target object T.

The information display device for a vehicle and the information display method for a vehicle in the present invention are not limited to those in the present embodiment. The information display device for a vehicle and the information display method for a vehicle in the present embodiment may be modified without changing the gist set forth in each of the aspects or those applied to others may be adapted as the information display device for a vehicle and the information display method for a vehicle in the present invention.

For example, in the embodiment described above, the frame-shaped first object marker X1 displayed on the display area 31 and the under-bar type second object marker X2 displayed on the display area 31 in the mode that the degree of emphasis of the vertical components is suppressed compared to that of the first object marker X1, and as a result thereof, the difference between degree of emphasis of the vertical components and the degree of emphasis of the horizontal component becomes high, are used. However, instead of the first object marker X1 or the second object marker X2, various object markers can be used.

As illustrated in FIG. 6, instead of the under-bar type second object marker X2, a triangle-shaped object marker X3 positioned above the target object T can be displayed on the display area 31. Furthermore, instead of the triangle-shaped object marker X3, for example, an over-line horizontally extending above the target object T or the like can also be used. In short, any type may be sufficient as long as the degree of emphasis of the vertical components is suppressed than that of the first object marker X1.

As illustrated in FIG. 7, instead of the under-bar type second object marker X2, an object marker X4 of which the vertical lines are narrower than that of the first object marker X1 may displayed on the display area 31. As illustrated in FIG. 8, instead of the second object marker X2, an object marker X5 of which the color of the vertical lines are paler than that of the first object marker X1 may be displayed on the display area 31. In addition, instead of the object marker X5, an object marker of which the brightness of the vertical lines is suppressed than that of the first object marker X1 may be displayed on the display area 31, and further, as illustrated in FIG. 9, instead of the second object marker X2, an object marker X6 in which the vertical lines of the first object marker X1 are eliminated may be displayed on the display area 31.

For example, a red colored frame-shaped object marker may be displayed as the first object marker X1 and only the color of the vertical lines thereof may be changed to yellow so as to be difficult to be recognized. In addition, a red colored frame-shaped object marker may be displayed as the first object marker X1 and only the color of the vertical lines thereof may be changed to blue which indicates the low degree of dangerousness. As described above, by the object marker in which the vertical lines of the frame-shaped first object marker X1 is made to be difficult to recognize and the degree of emphasis of the vertical components is suppressed being displayed on the display area 31, an effect similar to that in the embodiment described above can be obtained.

In addition, in the embodiment described above, in a case where the distance H is shorter than the threshold value Th, the first object marker X1 is selected, and in a case where the distance H is equal to or longer than the threshold value Th, the second object marker X2 is selected. However, the condition for selecting the object marker is not limited to the distance H. For example, the distance C which is the distance between the target object T and the object detection sensor 10 may set to the distance from the vehicle 100 to the target object T, and then, the distance C may be used as a condition for selecting the object marker. In this case, for example, in a case where the distance C from the vehicle 100 to the target object T is shorter than the threshold value Th, the first object marker X1 is selected, and in a case where the distance C from the vehicle 100 to the target object T is equal to or longer than the threshold value Th, the second object marker X2 is selected.

Incidentally, as the distance H which is the difference between the target object distance A which is the distance from the target object T to the driver M and the driver side distance B which is the distance from the display area 31 to the driver M becomes longer, the focus point of the eyes N of the driver M shifts largely, and thus, the vertical components of the object marker becomes easier to be blurred. That is, when the driver side distance B becomes relatively shorter than the target object distance A or when the target object distance A becomes relatively longer than the driver side distance B, the vertical components of the object marker is easily blurred.

Accordingly, as illustrated in FIG. 10, it is possible to reduce the possibility of the driver recognizing that the object marker is blurred, if the second object marker X2 is selected and the degree of emphasis of the vertical components is suppressed when the driver side distance B is shorter than the predetermined threshold value (the second threshold value) Tb. Therefore, it is possible to suppress the confusion that the driver may feel. Here, the predetermined threshold value Tb is a value of the driver side distance B which is the selection criteria for selecting the first object marker X1 or selecting the second object marker X2. This threshold value Tb may be, for example, a fixed value set in advance or may a variable value changed according a predetermined regulation. In addition, as illustrated in FIG. 11, the effect similar to that in the embodiment described above can be obtained, if the object marker X3 is selected and the degree of emphasis of the vertical components is suppressed when the target object distance A is equal to or longer than a threshold value Ta. The threshold value Tb can be set to, for example, 0.5 m and the threshold value Ta can be set to, for example, 50 m. However, the values of the threshold value Tb and the threshold value Ta can appropriately be changed respectively.

Furthermore, as illustrated in FIG. 12, both the driver side distance B and the distance H may be conditions for selecting the object marker. In FIG. 12, in a case where driver side distance B is equal to or longer than the threshold value Tb, the rectangular frame-type first object marker X1 is selected when the distance H is shorter than the threshold value Th, and the under-bar type second object marker X2 is selected when the distance H is equal to or longer than the threshold value Th. In a case where the driver side distance B is shorter than the threshold value Tb, the triangle-shaped object marker X3 is selected when the distance H is shorter than the threshold value Th, and a pale colored under-bar type object marker X7 is selected when the distance H is equal to or longer than the threshold value Th. That is, in each case where the distance H is long or short, it is possible to more finely adjust the degree of emphasis of the vertical components of the object marker according to the length of the driver side distance B.

Figure 13:
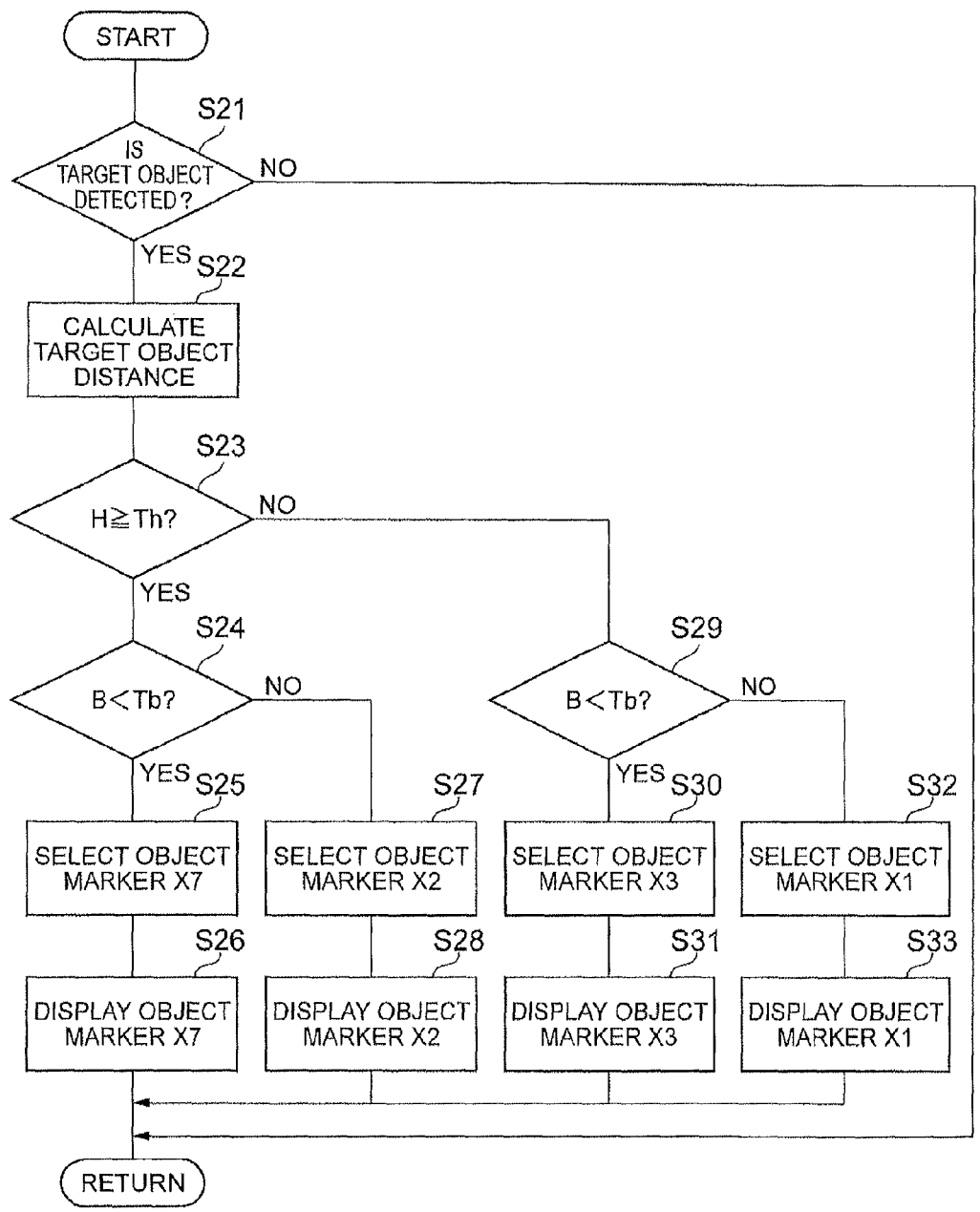
FIG. 13 is a flowchart illustrating information display processing for a vehicle in a modification example.

FIG. 13 is a flowchart illustrating processing that adjusts the degree of emphasis of the vertical components of the object marker according to the length of the distance H and length of the driver side distance B. As illustrated in FIG. 13, as similar to S11 and S12 in FIG. 4, the target object detection processing is executed by the object detection sensor 10 in S21, and then, the distances calculation processing is executed by the distance calculation unit 21 in S22. Then, the process proceeds to S23 and the difference comparison processing is executed, and the comparison between the distance H and the threshold value Th is performed in S23. In a case where the distance H is equal to or longer than the threshold value Th, the process proceeds to S24, and comparison between the driver side distance B and the threshold value Tb is performed. Here, in a case where driver side distance B is shorter than the threshold value Tb, the process proceeds to S25 and the object marker X7 is selected by the display design setting unit 22. Then, the object marker X7 is caused to be displayed by the HUD device 30 in S26, and then, a series of processes ends. On the other hand, in a case where the driver side distance B is not shorter than the threshold value Tb in S24, the process proceeds to S27, and the second object marker X2 is selected by the display design setting unit 22. Then, the second object marker X2 is caused to be displayed by the HUD device 30 in S28, and then, a series of processes ends.

In addition, in the difference comparison processing illustrated in S23, in a case where the distance H is not equal to or longer than the threshold value Th, the process proceeds to S29 and the comparison between the driver side distance B and the threshold value Tb is performed. Then, in a case where the driver side distance B is shorter than the threshold value Tb, the process proceeds to S30 and the object marker X3 is selected by the display design setting unit 22. Then, the object marker X3 is caused to be displayed by the HUD device 30 in S31, and then, a series of processes ends. On the other hand, in a case where the driver side distance B is not shorter than the threshold value Tb in S29, the process proceeds to S32 and the first object marker X1 is selected by the display design setting unit 22. Then, the first object marker X1 is caused to be displayed by the HUD device 30 in S33, and then, a series of processes ends.

As described above, in a case were the driver side distance B is short, the object marker X3 or the object marker X7 is displayed, in which the degree of emphasis is suppressed compared to the degree of emphasis of the vertical components of the first object marker X1 or the second object marker X2 which is displayed in a case where the driver side distance B is long. Here, the case where the driver side distance B (the distance from the display area 31 to the driver M) is long indicates that the driver side distance B is not shorter than the threshold value Tb, and the case where the driver side distance B is short indicates that driver side distance B is shorter than the threshold value Tb. As described above, in a case where the driver side distance B is short, it is possible to reduce the possibility that the driver M may recognize that the object marker is blurred by suppressing the degree of emphasis of the vertical components of the object marker. Therefore, the confusion that the driver M may feel can be reduced.

In addition, in the description above, the driver side distance B and the distance H are used for the condition for selecting the object marker. However, as the condition for selecting the object marker, both the target object distance A and the driver side distance B may be used, or the target object distance A and the distance H may be used.

Figure 14:
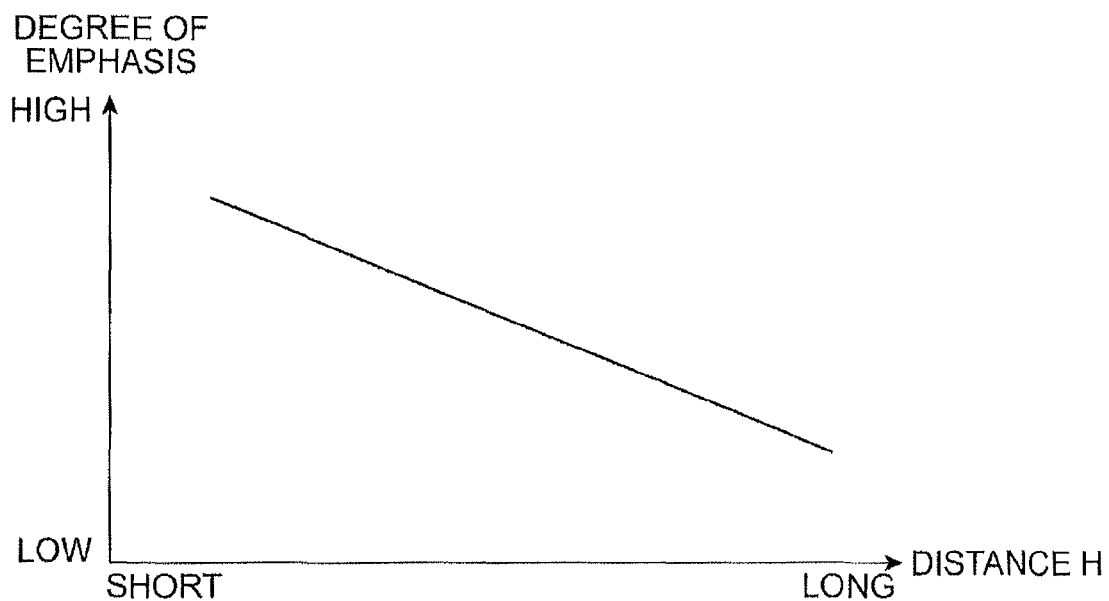
FIG. 14 is a graph illustrating a relationship between a distance from a target object to a display area and a degree of emphasis of an object marker.

In addition, in the embodiment described above, when the distance H is equal to or longer than the threshold value Th, the under-bar type second object marker X2 is displayed on the display area 31. However, the threshold value Th may not be used. FIG. 14 is a graph illustrating the relationship between the distance H and the degree of emphasis, and the horizontal axis indicates the distance H and the vertical axis indicates the degree of emphasis. As illustrated in FIG. 14, as the value of the distance H increases, the degree of emphasis of the vertical components may be gradually suppressed, and as the value of the distance H decreases, the degree of emphasis of the vertical components may be increased. Similarly, as the target object distance A increases, the degree of emphasis of the vertical components may be gradually suppressed, or as the driver side distance B decreases, the degree of emphasis of the vertical components may be suppressed. Furthermore, as the distance C from the vehicle 100 to the target object T increases, the degree of emphasis of the vertical components may be gradually suppressed. If the degree of emphasis of the vertical components is gradually suppressed as described above, the threshold value Ta and the threshold value Tb are also unnecessary.

In addition, with the degree of emphasis of the vertical components of the object marker suppressed, the suppressed degree of emphasis of the vertical components of the object marker may be gradually returned to the pre-suppressed degree of emphasis in each case where the distance H gradually becomes short, where the target object distance A gradually becomes short, where the driver side distance B gradually becomes long, or where the distance C from the vehicle 100 to the target object T gradually becomes short.

In addition, in the embodiment described above, the distance H is calculated by subtracting the driver side distance B from the target object distance A, but the distance from the display area 31 of the vehicle 100 to the target object T may be directly calculated as the distance H. In this case also, when the distance H is long, the degree of emphasis of the vertical components of the object marker can be suppressed. Therefore, the effect similar to that in the embodiment described above can be obtained.

In addition, in the embodiment described above, the display area 31 on which the object marker is displayed is the head-up display in the vehicle 100 and the display area 31 is positioned on the windshield 35. However, the position of the display area on which the object marker is display is not limited to the position described above. The position of the display area on which the object marker is display is not limited to the windshield 35, but may be outside or inside of the windshield 35. Furthermore, as the display area, a display other than the head-up display can be used. That is, instead of the HUD device 30 described above, for example, a monitor provided in the vehicle 100 or an electronic terminal that can be embedded in the vehicle 100 may be used as the display unit. Specifically, for example, a head-mount type device can also be used as the display unit.

Here, in a case where the head-mount type device is used as the display unit, for example, by setting the distance from the target object T to the eyes N of the driver M as the target object distance A and setting the distance from the display area of the head-mount type device to the eyes N of the driver M as the driver side distance B, the distance H can be similarly calculated. Then, in a case where the value of the distance H is long, it is possible to reduce the confusion that the driver may feel even in a case where the head-mount type device is used, by displaying the object marker in which the degree of emphasis of the vertical components is suppressed on the display area of the head-mount type device.

INDUSTRIAL APPLICABILITY

An aspect of the present invention can be used in the information display device for a vehicle in which it is possible to reduce the confusion that the driver may feel.

REFERENCE SIGNS LIST

10 object detection sensor (target object detection unit)
15 driver monitor camera (driver side distance detection unit)
20 ECU
21 distance calculation unit (driver side distance detection unit)
22 display design setting unit
30 HUD device
31 display area (head-up display)
35 windshield
40 display unit
100 vehicle (host vehicle)
A target object distance
B driver side distance
H distance (difference)
T target object
Tb threshold value (second threshold value)
Th threshold value (first threshold value)
X1 to X7 object markers

The invention claimed is:

1. An information display device for a vehicle, comprising:
   a target object detection unit configured to detect a target object positioned around a host vehicle; and
   a display unit configured to display an object marker which is displayed so as to surround the target object in order to emphatically display the target object detected by the target object detection unit on a display area positioned between a driver of the host vehicle and the target object, and configured to display the object marker with a degree of emphasis of the vertical components of the object marker suppressed in a case where a distance from the host vehicle to the target object is long compared to a degree of emphasis of the vertical components of the object marker in a case where the distance from the host vehicle to the target object is short, shorter than the long distance,
   wherein the display unit is also configured to display the object marker with the degree of emphasis suppressed in a case where the distance from the host vehicle to the target object is equal to or longer than a predetermined first threshold value compared to the degree of emphasis in a case where the distance from the host vehicle to the target object is shorter than the predetermined first threshold value.

2. The information display device for a vehicle according to claim 1, further comprising:
   a driver side distance detection unit configured to detect a distance from the display area to the driver,
   wherein the display unit is configured to display the object marker with the degree of emphasis of the vertical components of the object marker suppressed in a case where the distance from the display area to the driver is short compared to the degree of emphasis of the vertical components of the object marker in case where the distance from the display area to the driver is long, longer than the short distance.

3. The information display device for a vehicle according claim 2,
wherein the display unit is configured to display the object marker with the degree of emphasis suppressed in a case where the distance from the display area to the driver is shorter than a predetermined second threshold value compared to the degree of emphasis in a case where the distance from the display area to the driver is equal to or longer than the second threshold value.

4. The information display device for a vehicle according to claim 1, wherein the display area is a head-up display of the host vehicle.

5. The information display method for a vehicle, comprising:
a step of detecting a target object positioned around a host vehicle; and
a step of displaying an object marker which is displayed so as to surround the target object in order to emphatically display the target object, detected in the step of detecting the target object, on a display area positioned between a driver of the host vehicle and the target object, and displaying the object marker with a degree of emphasis of the vertical components of the object marker suppressed in a case where a distance from the host vehicle to the target object is long compared to a degree of emphasis of the vertical components of the object marker in a case where the distance from the host vehicle to the target object is short, shorter than the long distance,
wherein, in the step of displaying, the object marker is also displayed with the degree of emphasis suppressed in a case where the distance from the host vehicle to the target object is equal to or longer than a predetermined first threshold value compared to the degree of emphasis in a case where the distance from the host vehicle to the target object is shorter than the predetermined first threshold value.

\* \* \* \* \*